(12) United States Patent
James (10) Patent No.: US 6,862,877 B1
(45) Date of Patent: Mar. 8, 2005

(54) GAS TURBINES

(75) Inventor: David W James, Clevedon (GB)

(73) Assignee: James Engineering (Turbines) Limited, Clevedon (GB)

( * ) Notice: Subject to any disclaimer, the term of this patent is extended or adjusted under 35 U.S.C. 154(b) by 0 days.

(21) Appl. No.: 09/958,311

(22) PCT Filed: Apr. 5, 2000

(86) PCT No.: PCT/GB00/01267

§ 371 (c)(1),
(2), (4) Date: Jan. 2, 2002

(87) PCT Pub. No.: WO00/60225

PCT Pub. Date: Oct. 12, 2000

(30) Foreign Application Priority Data

Apr. 6, 1999 (GB) .............................................. 9907850

(51) Int. Cl.[7] .............................................. F02C 3/26
(52) U.S. Cl. ..................... 60/39.464; 110/264; 431/173
(58) Field of Search ..................... 60/39.464; 110/213, 110/261, 262, 264, 244; 431/9, 10, 173

(56) References Cited

U.S. PATENT DOCUMENTS

| | | | | |
|---|---|---|---|---|
| 1,530,321 A | * | 3/1925 | Pollock ....................... | 431/173 |
| 2,153,951 A | * | 4/1939 | Barber ........................ | 431/173 |
| 2,883,948 A | * | 4/1959 | Seidl ........................... | 431/173 |
| 2,973,727 A | * | 3/1961 | Northcote ................... | 431/173 |
| 3,271,951 A | * | 9/1966 | Nettel ....................... | 60/39.464 |
| 3,500,775 A | * | 3/1970 | Hubbard ..................... | 110/244 |
| 3,856,455 A | * | 12/1974 | Otway et al. ............... | 431/173 |
| 4,177,636 A | * | 12/1979 | Horgan ..................... | 60/39.464 |
| 4,218,426 A | * | 8/1980 | Dahmen ..................... | 431/173 |
| 4,257,760 A | * | 3/1981 | Schuurman et al. ........ | 431/173 |
| 4,409,786 A | | 10/1983 | Hamrick et al. ......... | 60/39.464 |
| 5,014,631 A | * | 5/1991 | Ikeda et al. ................. | 110/264 |
| 5,024,170 A | * | 6/1991 | Santanam et al. .......... | 110/264 |
| 6,269,755 B1 | * | 8/2001 | Boswell et al. ............. | 110/264 |

FOREIGN PATENT DOCUMENTS

| | | |
|---|---|---|
| EP | 234 265 | 8/1987 |
| GB | 2 197 390 | 5/1988 |
| WO | WO 86/00375 | 1/1986 |
| WO | WO 91/10053 | 7/1991 |
| WO | WO 95/35439 | 12/1995 |
| WO | WO 98/46869 | 10/1998 |

OTHER PUBLICATIONS

Hamrick, J.T., Development of Biomass as an Alternative Fuel for Gas Turbines, Apr. 1991, Pacific Northwest Laboratory, Washington.

McCarroll, R. and W. Partanen, Operation of a Direct–Fired Combustion Turbine System on Pulverized Wood, Aug. 1995, Portland, Oregon.

McCarroll, R. and W. Partanen, On–Site Power Generation for the Future, 1994, Washington, D.C.

* cited by examiner

*Primary Examiner*—Michael Koczo
(74) *Attorney, Agent, or Firm*—Michael A. Glenn; Glenn Patent Group (57) ABSTRACT

A biomass fuel combustor for use in the pressurized combustion comprising of biomass fule particles to produce a pressurized exhaust gas, the combustor comprising: a cyclonic combustion chamber having a combustion region and first and second fuel inlets, the first inlet being for the entry into the chamber of gas and/or liquid secondary fuel for combustion in said combustion region and the second inlet being for the entry into the chamber of biomass fuel particles also for combustion in said combustion region, the chamber being so constructed and arranged that the heat generated by the secondary fuel combustion will, in use and at least during stan-up of the combustor, promote fragmentation of the incoming biomass fuel particles.

63 Claims, 5 Drawing Sheets

GAS TURBINES

This invention relates to biomass fuelled gas turbines, particularly but not exclusively to a direct cycle biomass-fired gas turbine system, a biomass fuel combustor suitable for use in such a system and a process for the pressurized combustion of biomass fuel to produce power using a gas turbine system.

Biomass is a source of renewable energy that is "carbon dioxide neutral", i.e. it does not contribute to the global greenhouse effect. Utilization of biomass for the generation of electricity is, therefore, of considerable potential benefit to the environment but is at present, uneconomical. Combined heat and power (CHP) units offer high fuel conversion efficiencies (fuel utilization factors in excess of 75%) provided that the "heat component" is of sufficiently high grade. This requirement is met most satisfactorily by the gas turbine.

The simplest, and most cost-effective, way to utilize biomass fuel in a gas turbine is to burn it in the gas turbine's combustion chamber and pass the combustion gases directly through the turbine blades (this is what is understood by "direct cycle"). Unfortunately, the combustion of biomass leads to the formation of chemical compounds which, if allowed to deposit on turbine blade surfaces, can cause severe deterioration of performance by blockage, erosion and corrosion. Alternative method& of attempting to use biomass to fuel a gas turbine, involving pyrolysis, gasification and isolation of the combustion gases from the turbine by large heat exchangers, all give rise to high biomass conversion costs.

High performance gas turbines specifically developed for aerospace and land based applications have been utilized in direct cycle biomass-fired plants. Not only are such gas turbines expensive, accounting for up to half of the capital cost of the whole CHP plant, but their high inlet temperatures (>1000° C.) and pressure ratios (>10:1), necessary for high efficiency propulsion and shaft power applications, render them unsuitable for biomass conversion where temperatures are generally restricted to less than 830° C. in order to minimize the problems of deposition, erosion and corrosion (DEC) and pressure ratios optimize at about 5:1 for maximum efficiency in a recuperated cycle.

Aerospace-developed gas turbine engines also present operational problems when coupled to relatively massive biomass combustion systems (for example, ones with a combustor volume of >1 m$^3$), in that their dynamic characteristics are better suited to small, rapid response combustors.

High performance industrial (land-based) gas turbines are generally able to cope with larger combustion systems, but still suffer from the same problems of requiring high turbine inlet temperatures and pressure ratios for efficient operation with maximum electrical output or shaft power.

According to a first aspect of the present invention there is provided a biomass fuel combustor for use in the pressurized combustion of biomass fuel particles to produce a pressurized exhaust gas, the combustor comprising:

a cyclonic combustion chamber having a combustion region and first and second fuel inlets, the first inlet being for the entry into the chamber of gas and/or liquid secondary fuel for combustion in said combustion region and the second inlet being for the entry into the chamber of biomass fuel particles also for combustion in said combustion region, the chamber being so constructed and arranged that the heat generated by the secondary fuel combustion will, in use and at least during start-up of the combustor, promote fragmentation of the incoming biomass fuel particles.

The smaller that a gas turbine combustor can be made, the less expensive it is likely to be and the more rapidly it will be able to respond to operational demands that are imposed upon it, e.g. sudden changes in electrical load. It is important, however, that the combustor is not so small that the fuel is incompletely burned, otherwise efficiency and environmental emissions will suffer.

The minimum size of a combustor is primarily determined by the rate at which heat is released from the fuel, i.e. how fast if can be burned, safely and efficiently.

Provided that the fuel and oxygen (air) are well-mixed, the combustion rate is largely dependent on the rate of evaporation or devolatilisation of fuel particles which is, in turn, dependent on their surface-to-volume ratios.

With liquid fuels it is comparatively easy to produce small particles (droplets of diameter typically 10 to 100 micron) by "atomising" the liquid by forcing it though small orifices (or jets). With wood it is possible to produce small particles by progressively grinding larger particles but this process of comminution requires specialized (expensive) machinery and is wasteful of energy.

The method hereinafter described depends upon the disintegration of a wood (or biomass) cell that occurs when it is rapidly heated. Certain constituents of the cell interior change phase from a gel to a vapor, with such rapid increase in volume that the cell wall membrane is unable to contain the pressure thus generated and ruptures with explosive force scattering the millions of cellulose fibers comprising the membrane. These fibers, which would otherwise coalesce to form a slow burning char, are free to react rapidly with the air into which they are dispersed. The hiss and crackle when grass or brushwood is thrown onto a very hot bonfire is indicative of the acoustic energy released by these explosive forces.

A second, though no less important, feature of this mechanism is that the resultant ash particles are also very small (sub-micron in diameter) having high drag-to-weight coefficients which cause them to be entrained by the gas flow. If the gas is then cooled rapidly to a temperature that prevents or impedes particle coalescence and growth, most (e.g. >95%) of the ash particles can be made to pass between the turbine blades without contacting the surface of the blades. Thus DEC is prevented.

According to a second aspect of the present invention there is provided a direct cycle biomass-fired gas turbine system, comprising:

a biomass combustor for the pressurized combustion therein of biomass; and a gas turbine including a turbine section, arranged to receive and be driven by the hot pressurized combustion gas resulting from said biomass combustion, and a compressor section, wherein the gas turbine is so constructed and arranged that, when operated in a recuperated cycle at a turbine section gas inlet pressure in the range of 3–7 times atmospheric pressure, the gas turbine will work at maximum efficiency.

By being a direct cycle the complication and cost of pyrolising or gasifying the biomass, or seeking to isolate the biomass fuel combustion gases from the turbine by large heat exchangers, can be avoided.

Advantageously, the combustor in the system according to the second aspect of the present invention is the combustor of the first aspect of the present invention.

According to a third aspect of the present invention there is provided a process for the pressurized combustion of biomass fuel to produce power, the method comprising:

providing a system in accordance with the second aspect of the present invention, combusting biomass fuel under pressure in the combustor to produce hot pressurized combustion gas;

expanding said hot pressurized combustion gas through the turbine section of the gas turbine to produce a power output.

The gas turbine is specifically designed to cope with the special requirements of biomass combustion. Its performance is optimized at turbine inlet temperatures below 900° C., for example around 850° C. When recuperated it has a maximum efficiency at pressure ratios in the range 3:1 to 7:1, for example around 5:1. It is also capable of coping with limited amounts of DEC, and is capable of handling large, slow response biomass combustors, for example ones of >1 m$^3$ internal volume.

Figure 1:
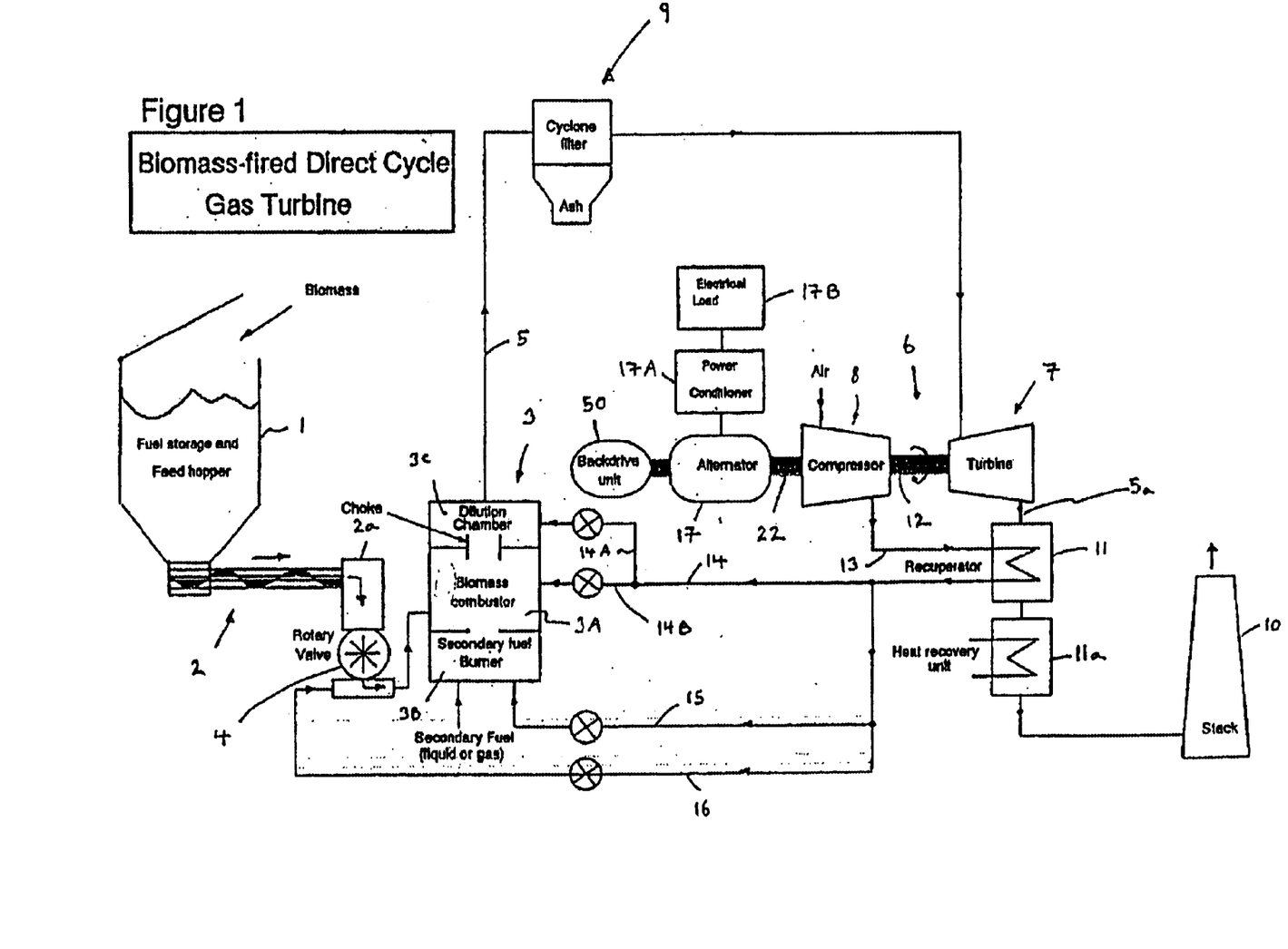
FIG. 1 is a schematic of an embodiment of a biomass-fired direct cycle gas turbine system.

Embodiments of apparatus in accordance with the present invention will now be described, by way of example only, with reference to the accompanying drawings in which:

FIG. 1 illustrates schematically an embodiment of biomass-fired direct cycle gas turbine system.

So as to minimize problems with deposition, erosion and corrosion (DEC) of the gas turbine, the preferred biomass fuel for the system of the present invention is wood. The reason for this is that many woods have a relatively low ash content (less than 2%), as well as a high ash fusion temperature, for example greater than 800° C. in contrast, coal has an ash content of the order of 15–30%. In addition to there being less of it, the ash produced by burning wood tends to be less abrasive than that produced by burning coal. The wood chips preferably have a particle size of maximum dimension up to about 20 mm.

In the illustrated embodiment of system, biomass fuel is stored in a feed hopper 1. At the base of the hopper a screw auger 2 (such as a modified Veto unit produced by Alatalkari) is provided to feed the biomass fuel continuously from the hopper 1, through the intermediate hopper 2a, to the biomass combustor 3 via one or more rotary valves 4, (such as a Blowing Seal produced by Rotolok). The inlet end of the auger 2 is at approximately atmospheric pressure and the interior of the biomass combustor 3 has an operating pressure of typically 3–5 barg (as will be explained later). The comparatively low pressure ratio inside the combustor 3 ensures that sufficient pressure sealing is achieved by the rotary valve(s) 4 combined with the flow impedance of the auger 2 to avoid significant loss (>1%) of combustor pressure.

Although the biomass combustor 3 will be described in more detail later in conjunction with FIGS. 3 and 4, in describing the system of FIG. 1 a brief description of the combustor will be included.

In FIG. 1 the biomass combustor is shown schematically as including a central combustion chamber 3A. At the lower end of the combustor 3 in FIG. 1 there is shown a secondary liquid/gas fuel burner 3B, whose purpose will be described later. At the upper end of the combustor 3 there is shown a dilution chamber 3C. The purpose of this chamber 3C will also be described later. Depending on the detailed combustor design, it may be mounted with its axis horizontal or vertical.

For present purposes it is sufficient to say that, in use, hot pressurized combustion gas from biomass and/or secondary fuel combustion exits the combustor 3 along exhaust pipe 5.

The system includes a gas turbine 6, comprising a turbine section 7 and a compressor section 8. Before reaching the inlet to the turbine 7 the hot pressurized combustion gas passing along exhaust pipe 5 may be fed through a filter 9 typically a cyclone filter, to remove any of the larger ash particles or other debris carried in the gas. Whilst this optional cyclone filter 9 may not remove very small ash particles of typically less than 1 micron, the particles that it cannot remove are generally of a sufficiently small size as to cause minimal deposition, erosion and corrosion problems to the turbine stage of the turbine section 7 when passing therethrough.

Upon entering the inlet to the turbine section 7 the hot pressurized combustion gas is expanded through the turbine and exits the turbine section 7 via a further exhaust pipe 5a. In the illustrated embodiment these waste exhaust gases are vented via a stack 10. Prior to being vented, the waste exhaust gases passing through pipe 5a (as shown in FIG. 1) pass through a heat exchanger or recuperator 11 to exchange heat with compressed air exiting the gas turbine's compressor section 8. Thereafter the exhaust gases may, as shown, pass through a heat recovery unit 11 a which will transfer heat as part of an overall CHP plant.

As will be explained in more detail in conjunction with FIGS. 2 and 3 below, the turbine and compressor sections 7, 8 of the gas turbine 6 are connected by a common shaft 12, such that driving of the turbine section 7 by the expansion therethrough of the hot pressurized combustor gas causes the compressor section 8 to intake air and to output compressed air via a pipe 13. In the FIG. 1 illustrated embodiment this compressed air in pipe 13 is passed through the heat exchanger or recuperator 11 prior to the pipe splitting into several feeds 14, 15, 16.

Compressed air feed 14 itself splits into two feeds 14A, 14B. As will be explained below, feed 14A is routed to the dilution chamber 3C of the combustor 3 and feed 14B is routed to the combustion chamber 3A of the combustor 3.

Feed 15 goes to the secondary fuel burner 3B.

Compressed air feed 16 goes to the rotary valve 4, such that the biomass fuel injected into the combustor 3 via the rotary valve is, in fact, a mixture of biomass fuel particles and compressed air.

Feeds 14A, 14B, 15 and 16 are, as shown schematically, advantageously provided with control valves to regulate air flow.

In order to provide a power output the shaft of the gas turbine 6 is linked to an alternator 17 for the generation of electrical power, this alternator being provided with a power conditioner 17A and an electrical load 17B in a known manner.

A backdrive unit (also known as a variable frequency speed control unit) 50 may, as shown, also be provided in series with the alternator 17 to act like a starter motor to enable rapid start-ups. At start-up the backdrive unit can be used to spin the gas turbine 6 up to self-sustaining speed (with zero load at the alternator).

Figure 2:
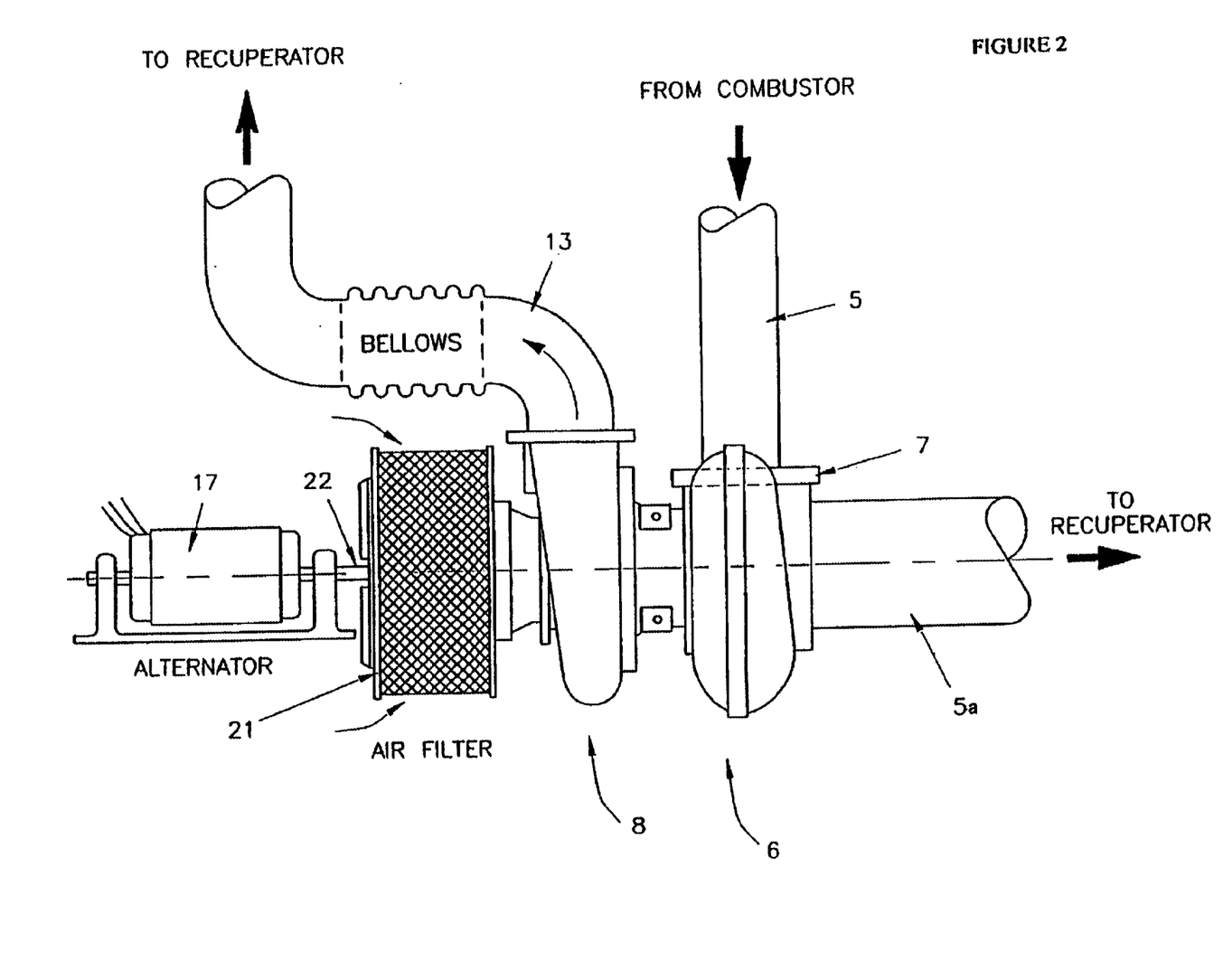
FIG. 2 illustrates an embodiment of a gas turbine suitable for use in the system of FIG. 1.
Figure 3:
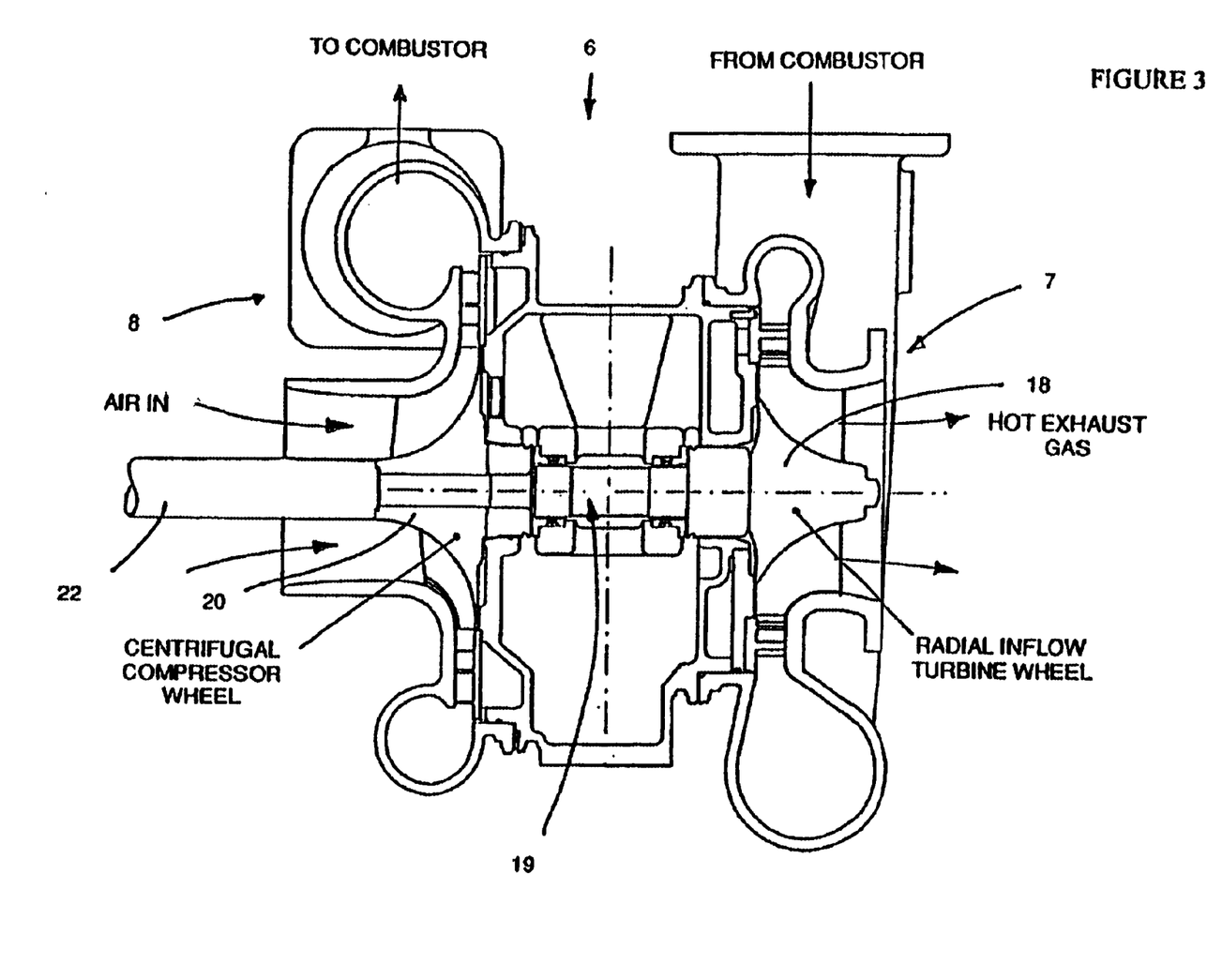
FIG. 3 is a cross-sectional view of an alternative embodiment of a basic turbine (with ancillaries and pipework removed) suitable for use in the system of FIG. 1.

The construction of the gas turbine will now be looked at in more detail in conjunction with FIGS. 2 and 3.

The preferred form for the gas turbine 6 is based on a turbocharger adapted from automotive, marine of similar reciprocating engine applications. For this reason the turbine construction will not be described in detail. In contrast to aerospace-developed and high performance industrial land-based gas turbines, a gas turbine of the sort illustrated in FIGS. 2 and 3 has been found to be very well suited for use with a biomass combustor. In automotive and marine derived turbochargers, the rotating components are generally designed for optimum performance at pressure ratios of the order of 4 to 6, and are also capable (with substitution of higher temperature materials for critical components) of sustaining prolonged operation at temperatures of the order of 850° C. Furthermore, automotive, marine and similar turbochargers are inexpensive relative to high performance gas turbines, and the inventor has found them to be generally suited to incorporation in gas turbines rated from 5 to 500 kWe. The blades of the radial inflow turbine wheel 18 of the turbine 6, as well as its associated stator blades, are configured so as to minimize deposition and impaction of ash particles of the size present in the hot pressurized combustion gas. In this way the turbine 6 can be made far more resistant to performance degradation from deposition, erosion and corrosion than can the turbine section of an axial flow aerospace developed or high performance industrial land-based gas turbine.

In the exemplary process of FIG. 1, the hot pressurized combustion gas provided, via pipe 5 to the inlet of the turbine section 7, is at approximately 800° C. After expansion across the radial inflow turbine wheel of the turbine section 7 the combustion gas, now at reduced pressure, exits the turbine section 7 via exhaust pipe 5a.

Although FIG. 3 illustrates a slightly different embodiment of gas turbine to that illustrated in FIG. 2, the constructions of the FIG. 2 and FIG. 3 devices are very similar and are conventional for automotive or marine turbochargers. As can most readily be seen in FIG. 3, the turbine section 7 contains a single radial inflow turbine wheel 18, constituting a single turbine stage which is conventional for automotive, marine or similar turbochargers.

This turbine wheel 18 is mounted on the opposite end of a bearing-supported shaft 19 to a centrifugal compressor wheel 20, housed in the compressor section 8, constituting a single compressor stage. As in an automotive turbocharger, driven rotation of the centrifugal compressor wheel 20 causes air to be drawn in axially and compressed, prior to its passage to compressor section exit pipe 13. In FIG. 2 the compressor inlet is provided with an air filter element 21 to filter the air drawn into the compressor section 8. This filter 21 is omitted in FIG. 3.

It will be appreciated that operation of the gas turbine 6 not only produces a supply of compressed air, which exits the turbine compressor section 8 via pipe 13, but drives the alternator 17, either directly or via a gearbox (not shown), to produce electrical power.

The general principles of cyclonic combustors are well understood and only those aspects specific to the present invention are considered here. A suitable background reference is: Syred, N., Claypole, T. C. and MacGregor, S. A., 1987, "Cyclone Combustors", Principles of Combustion Engineering for Boilers, Academic Press.

Figure 4:
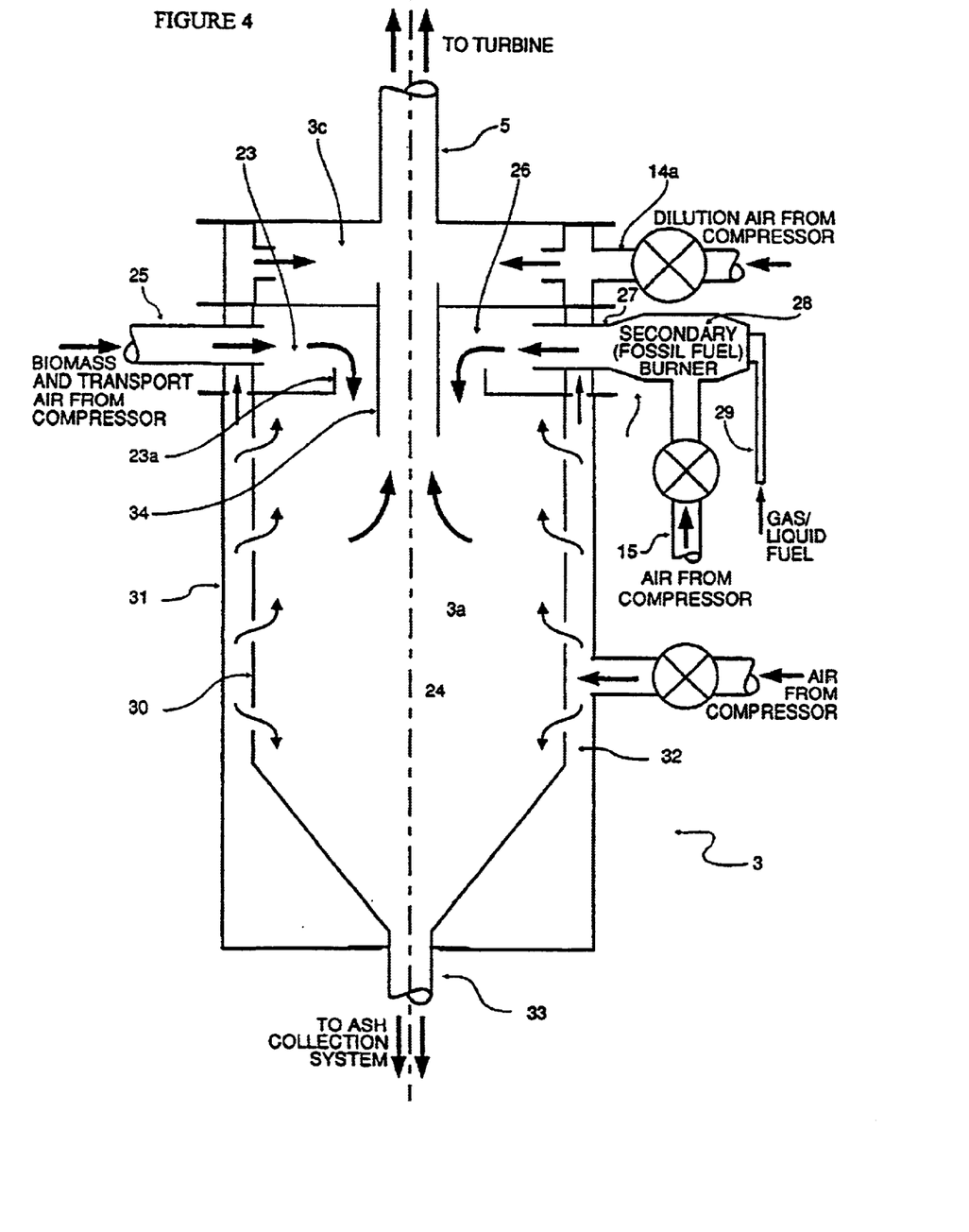
FIG. 4 illustrates, in longitudinal cross-section, an embodiment of combustor suitable for use in the system of FIG. 1.

In the first embodiment of combustor illustrated in FIG. 4, a mixture of biomass particles and air is introduced into the combustion chamber 24 via an inlet pipe 25, into an annular region 23 exterior to a choke tube 34 and including a lip or weir 23A. The biomass particles, coming from rotary valve(s) 4, are mixed in a compressed air stream from compressed air feed pipe 16—see FIG. 1. Typical temperatures and pressures for the compressed air stream are 150–300° C. and 3–5 barg respectively. A high level of dilution air is fed through pipe 14a, for example approximately twice the amount of air necessary for stoichiometric combustion. This high level of dilution air not only helps to keep the turbine inlet temperature down below the biomass fuel's ash fusion temperature, so as to reduce the likelihood of any ash in the hot pressurized combustion gas sticking to the turbine wheel 18, but it also helps to minimize the size of the ash particles by reducing the likelihood of agglomeration. The smaller the ash particle size the less damage the particles are likely to cause to the turbine wheel 18, and very small particles (typically <1 micron) can be made to pass between the blades of the turbine without impaction or deposition.

The combustor illustrated in FIG. 4 is a cyclonic combustor having an upstream combustion region 26 and a downstream combustion region. To help to encourage tangential flow in the combustion chamber 24, and in the upstream combustion region 26, the biomass/air inlet pipe 25 is oriented so that the entering biomass/air mixture includes a significant (generally >30 m/s) tangential component, relative to the longitudinal axis of the combustor 3. The upstream combustion region 26 at the top end of the combustion chamber 24 of the FIG. 4 combustor is provided with a further inlet 27. This inlet is part of a secondary fuel burner 3B. In the illustrated embodiment, the entry of the inlet 27 is approximately 180° displaced from the biomass fuel/air inlet pipe 25 and is also oriented so that the flame of the secondary burner 3B also includes a significant (generally >30 m/s) tangential component. This secondary fuel burner is fuelled by a gas or liquid secondary fuel. The secondary fuel burner, which may for example be a kerosene burner, has a fuel feed 29 and a compressed air feed 15. The auger(s) 2, the compressed air feed 15 and secondary fuel feed 29 can all be regulated by a controller (not shown) according to power demand.

One use of the secondary burner 28 is on start-up of the combustor. Not only can the secondary burner 28 be used to heat up the interior of the combustion chamber 24, it can be used to ignite the initial flow of biomass particles/air entering annular region 23 via feed pipe 25. The high flame temperature of the secondary burner 28 (approximately 1600° C.) causes very rapid heating of the incoming biomass particles, causing near instantaneous (less than 10 ms) fragmentation of those particles, accelerating combustion rates. After the biomass has been ignited, the secondary fuel burner can be switched from being completely responsible for combustion in the combustion chamber 24 to being only part responsible. For example, in steady-state conditions the secondary burner 28 may account for up to 10% of the energy input into the combustor. Under these circumstances the rapid heating of the incoming biomass particles will derive from radiative heat transfer from the biomass flame.

In one embodiment, the combustor is so constructed and arranged that biomass fuel particle fragmentation takes place within 10 ms of said particles entering the upstream region of the combustor via the second inlet. Further, in such embodiments the particles fragment to a mean size of <<1 mm.

In another embodiment, the combustion chamber is so constructed and arranged that both volatile and char burnout of the biomass fuel particles is complete within 100 ms of the particles entering the upstream region of the combustor via the second inlet.

In other embodiments, the heat release rate of the combusted biomass fuel is greater than 5 MW/m$^3$ of biomass fuel. Alternatively, the heat release rate is such that both volatile and char burnout of the biomass fuel is complete within 100 ms.

In further embodiment, the mean temperature at the outlet from the combustion chamber of the combustor is typically between 1100° C. and 1500° C.; and the temperature of the hot pressurized combustion gas exiting the dilution chamber is typically between 700° C. and 900° C.

Advantageously, the capacity of the secondary burner 28 is such that full load operation of the gas turbine system can be achieved using the secondary burner 28 alone. In this way, any problems with the biomass feed system requiring the system to be shut down need not affect the system's power generation, enabling the biomass feed system to be isolated for maintenance whilst the system as a whole remains on-load.

Whilst it may be possible to reduce the energy input of the secondary burner to less than 10% of the total on a time-average basis, there are benefits in continuing to run the secondary burner. Not only will it then continue to contribute to maintaining the high temperature in the combustion region 26 to cause near instantaneous fragmentation of the biomass particles, it is also very helpful from the point of view of system control. Rapid variations in power demand (faster than 10% in approx 1 second), as well as alternator speed regulation, can be readily satisfied by varying operation of the secondary burner 28.

In contrast to known biomass combustors, in the embodiment of combustor illustrated in FIG. 4 the flame can 30 defining the combustion chamber 24 is made of metal (for example stainless steel, or proprietary heat-resistant metals such as the inconel series of alloys) and is not lined with refractory material. Refractory material in known combustors is present not only to protect the underlying surface forming the combustion chamber against heat damage, but also to provide an extensive radiant non-metallic refractory surface to promote biomass ignition and combustion. The presence of a large amount of refractory material is, however, disadvantageous. Firstly, at start-up from "cold", significant energy is required to be input into the combustor in order to raise the refractory material to a temperature (generally >1000° C.) at which its surface will radiate sufficiently to promote biomass ignition. Secondly, the combustor has large thermal inertia such that it is very difficult to match power generation to rapid and sudden responses in demand. In an extreme situation, a rapid and sudden reduction in demand for power can lead to overspeeding and damage of the associated gas turbine. Thirdly, in known refractory lined combustors any refractory material breaking away from the lining of the combustion chamber can enter the turbine downstream of the combustor causing significant damage to the turbine assembly. Accordingly, the predominantly metal construction of the combustor not only allows fast start-up, but also improves response to transients.

A thin refractory material lining of less than 2 mm thickness may, however, be provided on the interior wall of at least part of the flame can 30.

In the FIG. 4 embodiment the flame can 30 is surrounded by a wind box 31 of metal construction, forming a chamber 32 to which compressed air (from the compressor 8) is supplied via compressed air feed 14B. A plurality of air injection openings are provided in the wall of the flame can 30 and these openings are arranged such that pressurized cooling air introduced into the chamber 32, via feed pipe 14B, will enter the downstream combustion region of the combustion chamber 24 with a generally tangential component to promote cyclonic swirl in the combustion chamber 24; the air flow through these openings is marked with small arrows in FIG. 4. Tangential velocities generally exceed 30 m/s and are typically about 50 m/s.

At the base of the FIG. 4 combustor an outlet 33 is provided for ash. The cyclonic swirl within the combustion chamber 24 will cause the heavier ash and debris particles to be collected and exit via outlet 33, to be collected by an ash collection system (not shown).

The combustion of the biomass fuel and the secondary fuel in the combustion region 26 of the combustor 3 produces a hot pressurized combustion gas. The gas pressure and temperature in the combustion chamber 24 is typically 3–5 barg and 1100 to 1500° C. respectively. In the FIG. 4 embodiment, the hot pressurized combustion gas exits the combustion chamber 24 via an outlet in the form of a choke tube 34. Downstream of the outlet 34, before passing completely out of the combustor 3, the hot gas passes through a dilution chamber 3C. The circumference of the dilution chamber 3C is provided with a plurality of inlets for compressed air from compressed air feed 14A. Not only does the supply of compressed air to the dilution chamber 3C reduce the mean gas temperature from approximately 1200° C. to approximately 800° C., but by appropriate shaping of the compressed air inlets in the dilution chamber 3C the air may be introduced into the dilution chamber in a manner so as to reduce the swirl of the exhaust gas. The reduced temperature combustion gas finally exits the combustor assembly 3 along pipe 5 to pass, via cyclone filter 9, to the inlet of the turbine section 7 of the gas turbine 6.

The near instantaneous (<10 ms) fragmentation of the biomass particles in the combustor is highly desirable in that they may be made to burn with. combustion kinetics similar to those of liquid fuel droplets. Furthermore, volatile and char burnout of the biomass fuel particles takes place within about 100 ms. Smaller wood particles burn more rapidly than larger wood particles. However, mechanically breaking wood particles up to make them smaller is demanding of both time and energy. By utilizing the rapid heating of the biomass particles in the secondary fuel flame and the radiant heat from biomass combustion, wood particles of a maximum dimension of 20 mm can be made to fragment near instantaneously (in less than 10 ms) to provide efficiently very small particles (notionally <<1 mm). A further important consequence of the small biomass particle size is that the ash particles that derive from it will also be small (typically <1 micron) and can be made to pass between the blades of the turbine without deposition or impaction upon the blades, provided they can be prevented from agglomerating to form larger particles. This is achieved by rapidly cooling the particles in the dilution chamber before agglomeration can take place.

Figure 5:
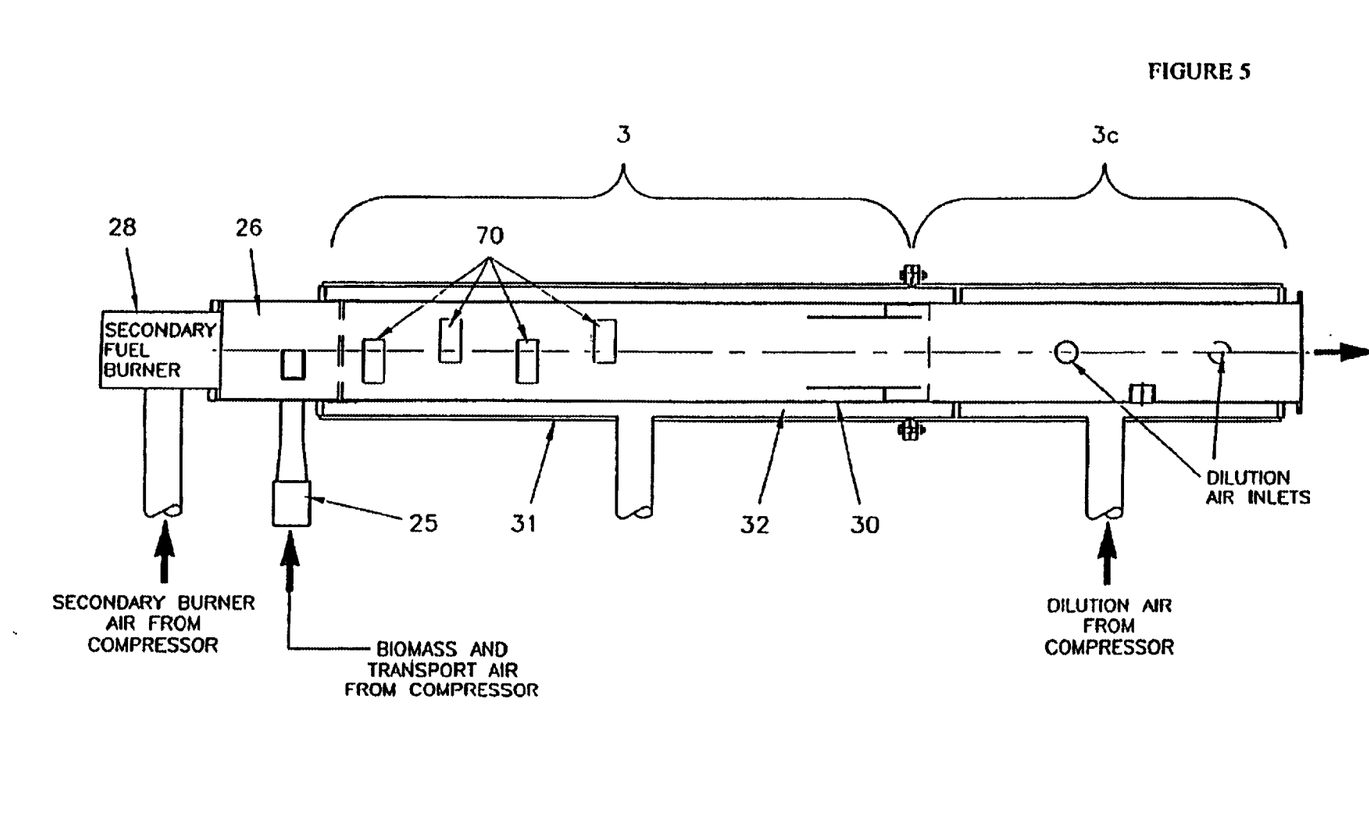
FIG. 5 illustrates, in longitudinal cross-section, another embodiment of combustor suitable for use in the system of FIG. 1.

An alternative embodiment of combustor construction is illustrated in FIG. 5. In many respects, this combustor is similar to that illustrated in FIG. 4. The FIG. 5 combustor also includes a metal flame can 30 surrounded by a wind box 31, with the chamber 32 formed therebetween being supplied with compressed air from the gas turbine's compressor section 8 (not shown). The walls of the metal flame can are provided with air injection apertures 70 to promote swirl in the combustor.

In the FIG. 5 embodiment no ash collection exit (equivalent to outlet 33 in FIG. 4) is provided, it can be provided separately as part of the cyclone filter 9 in FIG. 1. The FIG. 5 combustor does however, include a downstream dilution chamber 3C, into which compressed air is introduced with a significant radial component to reduce the temperature of the hot pressurized combustion gas and to reduce swirl. The reduced temperature gas passes from the combustor 3 at the right hand end (as drawn in FIG. 5) to exhaust pipe 5 and filter 9 (not shown).

The most significant difference between the embodiments of combustor illustrated in FIGS. 4 and 5 lies at the left hand end. In the arrangement of the secondary burner 28 and the biomass/air mixture inlet pipe 25. Although (as in the FIG. 4 embodiment) in the FIG. 5 embodiment the biomass/air mixture entry pipe 25 is generally tangential to the longitudinal axis of the combustor 3. In contrast to the FIG. 4 embodiment the secondary burner is axially aligned with the longitudinal axis of the combustor so that its flame enters axially rather than tangentially as in the FIG. 4 embodiment. The operation of both embodiments is, however, similar in that the wood/transport air mixture entering the combustion region 26 of both embodiments of combustor 3 is rapidly heated in the biomass flame and the flame of the secondary burner 28 to produce near instantaneous fragmentation of the biomass particles, and hence accelerated combustion rates for those particles.

The illustrated embodiments of combustor are capable of operating efficiently at low pressure ratios and with high excess air. They are thus able to provide acceptable turbine inlet temperatures, produce small size ash particles, allow for simple low cost pressure containment and have low environmental emission levels. For example, it is anticipated that the following levels are achievable: CO<200 mg/MJ and NOX<90 ppm at 15% oxygen.

Although both illustrated embodiments of gas turbine have a turbine section including a single turbine stage and a compressor section including a single compressor stage, this is not essential. It is thought that more complicated, multi-stage gas turbine constructions may be possible while retaining the robust and flexible characteristics of the above described embodiments of gas turbine and avoiding the undesirable characteristics typical of aero-derived, or high performance land-based, gas turbines.

Although it is preferred to operate the turbine in a recuperated cycle, in which case the turbine will work at maximum efficiency at a turbine section gas inlet pressure in the range of 3–7 times atmospheric pressure, the turbine is not restricted to being used in a recuperated cycle.

What is claimed is:

1. A biomass fuel combustor for use in the pressurized combustion of biomass fuel particles to produce a pressurized exhaust gas for use in a direct cycle biomass-fired gas turbine system, the combustor comprising:

a cyclonic combustion chamber having an upstream combustion region and a downstream combustion region, the downstream region being arranged to receive combustion products from the upstream region, the upstream region having first and second fuel inlets, the second inlet allowing the entry into the upstream region of biomass fuel particles for combustion and the first inlet allowing the entry into the upstream region of fluid secondary fuel for combustion in the upstream region at least during start-up of the combustor; wherein heat is supplied to the upstream region, thereby promoting fragmentation in the upstream region of the biomass fuel particles entering the upstream region via the second inlet, wherein the second inlet is positioned such that biomass fuel particles enter the upstream region via the second inlet with a tangential component to promote cyclonic motion of gases and biomass particles in the upstream region and wherein the downstream region of the combustion chamber is provided with a plurality of air injection openings arranged such that air enters the downstream region of the combustion chamber with a tangential component to promote cyclonic motion of gases and fragmented biomass particles in the downstream region of the combustion chamber, wherein the combustor further comprises a first outlet for the efflux from the combustion chamber of the hot pressurized combustion gas resulting from the biomass and/or secondary fuel combustion and also further comprises a dilution chamber downstream of said first outlet, said dilution chamber being provided with one or more third inlets for the supply to the dilution chamber of air to dilute the hot pressurized combustion gas.

2. A combustor as claimed in claim 1, wherein the combustor is so constructed and arranged that biomass fuel particle fragmentation takes place within 10 ms of said particles entering the upstream region of the combustor via the second inlet.

3. A combustor as claimed in claim 2, wherein the combustion chamber is so constructed and arranged that both volatile and char burnout of the biomass fuel particles is complete within 100 ms of the particles entering the upstream region of the combustor via the second inlet.

4. A combustor as claimed in claim 1, wherein the combustion chamber is substantially defined by a flame can.

5. A combustor as claimed in claim 4, wherein the flame can is predominantly made of metal.

6. A combustor as claimed in claim 4, wherein the flame can, at least in the region of the first and second fuel inlets, is unlined with refractory material.

7. A combustor as claimed in claim 4, wherein the flame can is substantially enclosed by a wind box, to form a chamber between the exterior of the flame can and the interior of the wind box, whereby a supply of pressurized cooling air to said chamber cools the flame can.

8. A combustor as claimed in claim 7, wherein the air injection openings are provided in the wall of the combustion chamber, opening into the wind box, so that the pressurized cooling air supplied to the chamber between the combustion chamber and the wind box enters the combustion chamber via said openings.

9. A combustor as claimed in claim 1, wherein the first inlet forms part of a burner for the secondary fuel.

10. A combustor as claimed in claim 9, wherein the burner is for fluid fossil fuel.

11. A combustor as claimed in claim 1, wherein the first inlet is positioned relative to the cyclonic combustion chamber such that in use, the flame produced by combustion of the secondary fuel is generally tangential to the longitudinal axis of the chamber.

12. A combustor as claimed in claim 11, wherein the first and second inlets are generally diametrically opposite one another.

13. A combustor as claimed in claim 1, wherein the first inlet is generally coaxial with the longitudinal axis of the combustion chamber.

14. A combustor as claimed in any claim 1, wherein the combustor is provided with a first outlet for receiving the efflux from the combustion chamber of the hot pressurized combustion gas resulting from the biomass and/or secondary fuel combustion.

15. A combustor as claimed in claim 1, wherein said one ore more third inlets are provided and are arranged to introduce air into the dilution chamber to reduce the cyclonic motion and temperature of the hot pressurized combustion gas passing therethrough.

16. A combustor as claimed in claim 1, wherein the combustion chamber is provided with an outlet for the removal of ash.

17. A direct cycle biomass-fired gas turbine system, comprising: a biomass fuel combustor as claimed in claim 1; and
a gas turbine including a turbine section, arranged to receive and be driven by the hot pressurized combustion gas resulting from said biomass combustion, and a compressor section.

18. A system as claimed in claim 17, wherein the gas turbine is so constructed and arranged that, when operated in a recuperated cycle at a turbine section gas inlet pressure in the range of 3–7 times atmospheric pressure, the gas turbine will work at maximum efficiency.

19. A system as claimed in claim 17, wherein the turbine section comprises a stator and a rotor that are tolerant to ash present in the hot pressurized combustion gas, with passages between the blades of the stator and the rotor being configured so as to minimize deposition and impaction of ash particles of the size present in the hot pressurized combustion gas.

20. A system as claimed in claim 17, wherein the turbine section is of the radial flow type.

21. A system as claimed in claim 17, wherein the gas turbine is derived from an adapted automotive, marine or similar turbocharger.

22. A system as claimed in claim 17, wherein the gas turbine is so constructed arid arranged as to work at high efficiency at a turbine section inlet gas temperature of less than 900° C.

23. A system as claimed in claim 17, wherein the turbine section is arranged to receive the hot pressurized combustion gas directly from the combustor.

24. A system as claimed in claim 17, wherein the gas turbine includes a drive shaft connecting its turbine and compressor sections.

25. A system as claimed in claim 24, wherein the gas inlet to the turbine section is not coaxial with the axis of said shaft.

26. A system as claimed in claim 24, wherein the turbine includes only a single said drive shaft.

27. A system as claimed in claim 24, wherein the gas inlet to the turbine section is generally tangential to sad axis.

28. A system as claimed in claim 17, wherein said turbine section includes a single turbine stage.

29. A system as claimed in claim 28, wherein said turbine section includes a radial inflow turbine wheel.

30. A system as claimed in claim 17, wherein said compressor section includes a single compressor stage.

31. A system as claimed in claim 30, wherein the compressor section includes a centrifugal compressor wheel.

32. A system as claimed in claim 17, wherein at least one of said turbine and compressor sections is multi-staged.

33. A method of pressurized combustion of biomass fuel to produce power, the method comprising:
providing a system as claimed in claim 17;
combusting biomass fuel under pressure in the combustor to produce hot pressurized combustion gas;
expanding said hot pressurized combustion gas through the turbine section of the gas turbine to produce a power output.

34. A method as claimed in claim 33, further comprising supplying a secondary gas and/or liquid fuel to the combustion chamber of the combustor.

35. A method of pressurized combustion of biomass fuel in a biomass fuel combustor to produce a pressurized exhaust gas for use in a direct cycle biomass-fired gas turbine system, the method comprising:
providing a biomass fuel combustor having a cyclonic combustion chamber;
supplying fluid secondary fuel to an upstream combustion region of said combustion chamber;
combusting said secondary fuel in said upstream region of said combustion chamber;
supplying biomass fuel particles to said upstream region of said combustion chamber with a tangential component to promote cyclonic motion of gases and biomass particles in said upstream region;
at least during start-up of the combustor fragmenting said supplied biomass fuel particles in said upstream region using the heat generated by the combustion of said secondary fuel in said upstream region;
passing the fragmented biomass particles from said upstream region to a downstream region of said combustion chamber;
adding air into said downstream region with a tangential component to promote cyclonic motion of gases and fragmented biomass particles in said downstream region;
completing combustion of said fragmented biomass particles in said downstream region; and
diluting with air a hot pressurized combustion gas produced by combustion of the biomass particles and/or secondary fuel.

36. A method as claimed in claim 35, wherein said combustion of said biomass particles produces hot pressurized combustion gas, which gas is expanded through the turbine section of a gas turbine to produce a power output.

37. A method as claimed in claim 35, wherein the secondary fuel is used for start-up of said method, for supporting sustained ignition of the biomass fuel in the combustion chamber of the combustor and for responding to variations in the demand for pressurized exhaust gas.

38. A method as claimed in claim 35, wherein on start-up of the process only secondary fuel is supplied to the combustion chamber, with feeding of the biomass fuel being commenced only after combustion in the chamber has been established with the secondary fuel.

39. A method as claimed in claim 35, wherein at start-up, as the rate of feed of biomass fuel to the combustor is increased, the rate of supply of secondary fuel is reduced.

40. A method as claimed in claim 35, wherein the rate of supply of secondary fuel is varied in response to variations in turbine shaft speed and power output demand.

41. A method as claimed in claim 36, wherein the hot pressurized combustion gas is supplied to the turbine section at a temperature of approximately 700° C.–900° C.

42. A method as claimed in claim 36, wherein the hot pressurized combustion gas is supplied to the turbine section at a pressure of approximately 3–7 times atmospheric pressure.

43. A method as claimed in claim 36, wherein the hot pressurized combustion gas is supplied to the turbine section at a temperature below the ash fusion temperature of the biomass fuel.

44. A method as claimed in claim 43, wherein the ash fusion temperature is greater than 800° C.

45. A method as claimed in claim 35, wherein the pressure in the combustor is in the range of approximately 3–7 times atmospheric pressure.

46. A method as claimed in claim 36, wherein the turbine section is tolerant to deposition, erosion and corrosion from the exhaust gas.

47. A method as claimed in claim 35, wherein the biomass fuel is supplied to the combustion chamber of the combustor from a fuel supply at atmospheric pressure through a valve operated to maintain the higher pressure in the combustion chamber.

48. A method as claimed in claim 35, wherein air is supplied to the combustion chamber at a rate approximately twice that necessary for stoichiometric combustion.

49. A method as claimed in claim 35, wherein the heat release rate of the combusted biomass fuel is greater than 5 MW/m$^3$ of biomass fuel.

50. A method as claimed in claim 49, wherein the heat release rate is such that both volatile and char burnout of the biomass fuel is complete within 100 ms.

51. A method as claimed in claim 35, wherein the mean temperature at the outlet from the combustion chamber of the combustor is typically between 1100° C. and 1500° C.

52. A method as claimed in claim 35, wherein the temperature of the hot pressurized combustion gas exiting the dilution chamber is typically between 700° C. and 900° C.

53. A method as claimed in claim 35, wherein ash is removed by passing the hot pressurized combustion gas through a filter between the combustor and the gas turbine.

54. A method as claimed in claim 35, wherein the system can run and produce full power when solely fuelled by the secondary fuel.

55. A method as claimed in claim 35, wherein the gas turbine is used to generate electrical power.

56. A method as claimed in claim 35, wherein the compressor section of the gas turbine is used to compress air, at least some of the compressed air so produced being supplied to the combustor with the biomass fuel.

57. A method as claimed in claim 56, wherein said compressed air is also used to cool the combustor.

58. A method as claimed in claim 35, further comprising taking the expanded waste gas from the turbine section's exit and using said waste gas to heat compressed air output by the gas turbine's compressor section and/or in a heat recovery heat exchanger as part of a CHP system and/or for direct use as part of a drying system.

59. A method as claimed in claim 35, wherein the ash particles produced by the biomass particle combustion are of a sufficiently small size that they will pass through the turbine section without significant deposition, erosion or corrosion damage to the blades of the turbine section.

60. A method as claimed in claim 59, wherein the ash particles produced by the biomass particle combustion have a mean size of <1 micron.

61. A process as claimed in claim 35, wherein the biomass fuel particles fragment within 10 ms of the particles entering the combustion chamber of the combustor.

62. A process as claimed in claim 61, wherein the particles fragment to a mean size of <<1 mm.

63. A combustor as claimed in claim 9, wherein the burner is for fluid bio-fuel.

* * * * *